United States Patent [19]

Sono et al.

[11] Patent Number: 5,140,955
[45] Date of Patent: Aug. 25, 1992

[54] METHOD OF CONTROLLING AN INTERNAL COMBUSTION ENGINE

[75] Inventors: Hiroshi Sono; Hidezo Umiyama; Masakazu Kinoshita, all of Wako, Japan

[73] Assignee: Giken Kogyo K.K. (Honda Motor Co., Ltd., in English), Tokyo, Japan

[21] Appl. No.: 665,412

[22] Filed: Mar. 6, 1991

[30] Foreign Application Priority Data

Mar. 8, 1990 [JP] Japan .................. 2-59040

[51] Int. Cl.⁵ .................. F01L 1/34; F01L 9/04
[52] U.S. Cl. .................. 123/90.15; 123/90.11; 123/435
[58] Field of Search .......... 123/90.16, 90.15, 308, 123/432, 425, 435, 123, 90.11

[56] References Cited

U.S. PATENT DOCUMENTS

| | | | |
|---|---|---|---|
| 4,651,684 | 3/1987 | Masuda et al. | 123/90.16 |
| 4,656,976 | 4/1987 | Rhoads | 123/90.15 |
| 4,671,221 | 6/1987 | Geringer et al. | 123/90.16 |
| 4,696,265 | 9/1987 | Nohira | 123/90.16 |
| 4,765,288 | 8/1988 | Linder et al. | 123/90.16 |
| 4,887,561 | 12/1989 | Kishi | 123/90.16 |
| 4,892,067 | 1/1990 | Paul et al. | 123/90.16 |
| 4,917,057 | 4/1990 | Seki | 123/90.16 |
| 4,934,348 | 6/1990 | Yagi et al. | 123/90.16 |
| 4,960,083 | 10/1990 | Seki et al. | 123/90.16 |
| 4,960,095 | 10/1990 | Koike et al. | 123/90.16 |
| 4,995,351 | 2/1991 | Ohkubo et al. | 123/90.15 |
| 5,009,203 | 4/1991 | Seki | 123/90.16 |
| 5,020,487 | 6/1991 | Keüger | 123/90.15 |
| 5,022,357 | 6/1991 | Kawamura | 123/90.15 |
| 5,024,191 | 6/1991 | Nagahiro et al. | 123/90.16 |
| 5,033,420 | 7/1991 | Matayoshi et al. | 123/90.16 |

*Primary Examiner*—E. Rollins Cross
*Assistant Examiner*—Thomas N. Moulis
*Attorney, Agent, or Firm*—Arthur L. Lessler

[57] ABSTRACT

A method of controlling an internal combustion engine having at least one intake valve comprises the steps of (1) detecting a demand of the driver to the engine, (2) detecting operating parameters of the engine including engine rotational speed, and (3) setting the timing of closing the at least one intake valve to timing which makes output of the engine the maximum at the detected engine rotational speed, when it is detected that the driver demands that the maximum output of the engine should be obtained in at least a predetermined operating region of the engine. In another form of the invention, when the knocking of the engine is detected, the timing of closing the at least one intake valve is advanced or retarded by a predetermined amount from timing applied before occurrence of the knocking such that the engine has intake efficiency thereof lowered, at least in a predetermined operating region of the engine determined based on at least the detected demand of the driver to the engine and the detected engine rotational speed, and the advancing or retarding of the timing is continued even after the knocking of the engine ceases to occur.

11 Claims, 16 Drawing Sheets

FIG.7

| Ne \ $\theta_{ACC}$ | $\theta_{ACC1}$ | $\theta_{ACC2}$ | $\theta_{ACC3}$ | · · · | $\theta_{ACC18}$ | $\theta_{ACC19}$ |
|---|---|---|---|---|---|---|
| $Ne_1$ | $Ti_{1,1}$ | $Ti_{1,2}$ | $Ti_{1,3}$ | · · · | | |
| $Ne_2$ | $Ti_{2,1}$ | $Ti_{2,2}$ | | · · · | | |
| $Ne_3$ | $Ti_{3,1}$ | | | · · · | | |
| ⋮ | ⋮ | ⋮ | ⋮ | ⋱ | | |
| $Ne_{19}$ | | | | | | |
| $Ne_{20}$ | | | | | | $Ti_{20,19}$ |

FIG.8

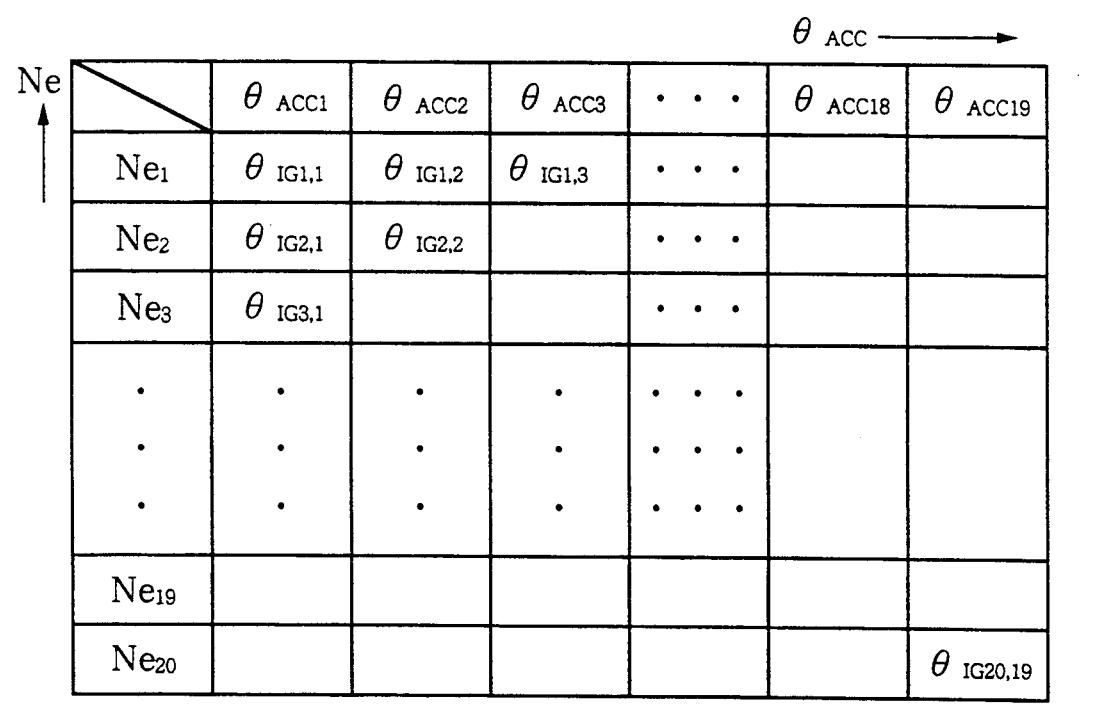

| Ne ↑ \ θ_ACC → | $\theta_{ACC1}$ | $\theta_{ACC2}$ | $\theta_{ACC3}$ | ... | $\theta_{ACC18}$ | $\theta_{ACC19}$ |
|---|---|---|---|---|---|---|
| $Ne_1$ | $\theta_{IG1,1}$ | $\theta_{IG1,2}$ | $\theta_{IG1,3}$ | ... | | |
| $Ne_2$ | $\theta_{IG2,1}$ | $\theta_{IG2,2}$ | | ... | | |
| $Ne_3$ | $\theta_{IG3,1}$ | | | ... | | |
| ⋮ | ⋮ | ⋮ | ⋮ | ⋮ | | |
| $Ne_{19}$ | | | | | | |
| $Ne_{20}$ | | | | | | $\theta_{IG20,19}$ |

FIG.13
(a)
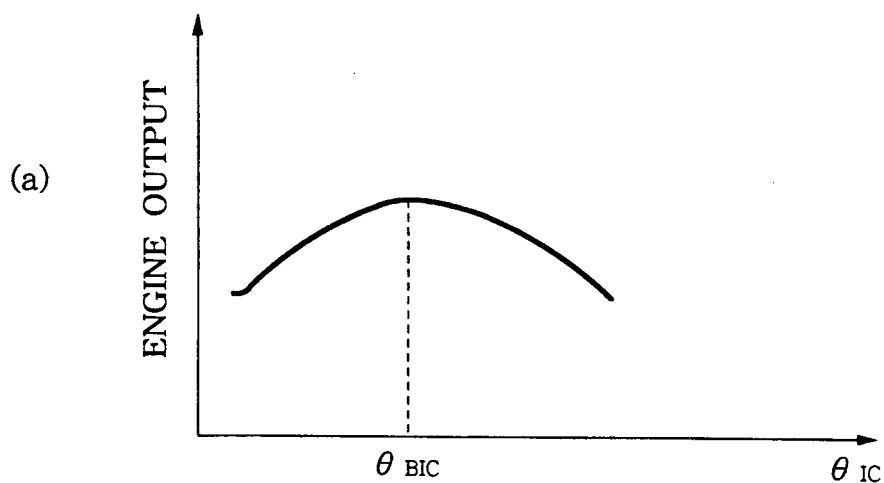
(b)
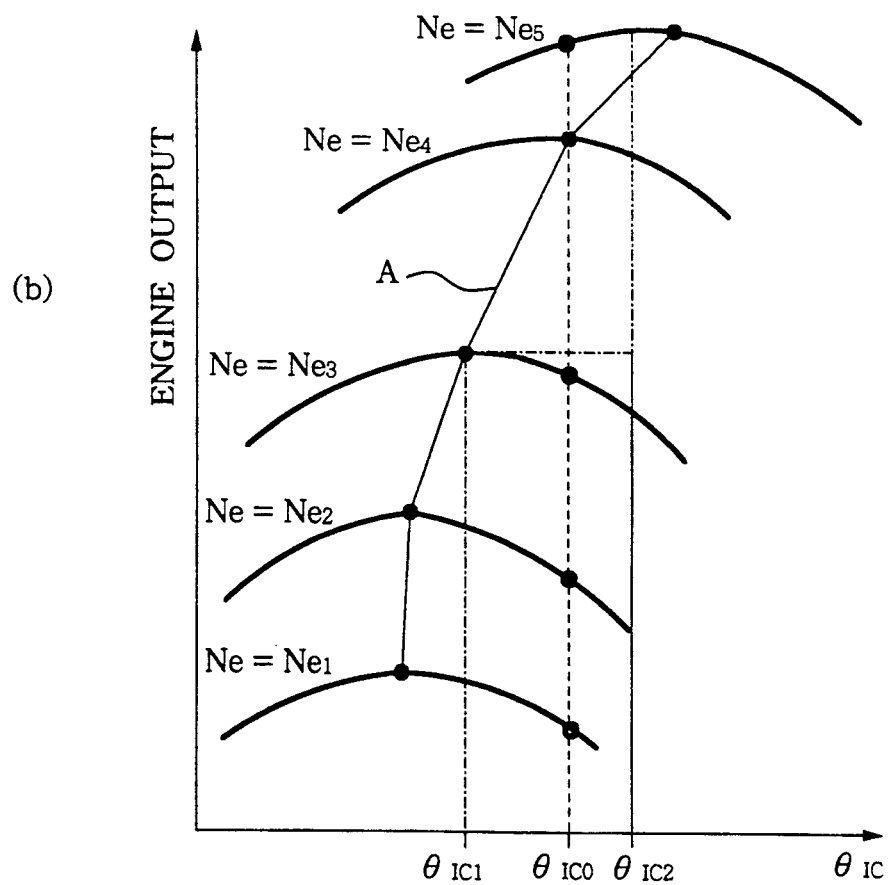

METHOD OF CONTROLLING AN INTERNAL COMBUSTION ENGINE

BACKGROUND OF THE INVENTION

This invention relates to a method of controlling an internal combustion engine, and more particularly to a method of controlling an internal combustion engine which is capable of setting the timing of closing an intake valve or intake valves as desired.

In such an internal combustion engine which is capable of setting the timing of closing an intake valve or intake valves as desired, it is conventionally known that by varying intake valve-closing timing ($\theta_{IC}$) with the engine rotational speed being held constant and the ignition timing being kept optimum, there can be found valve-closing timing (hereinafter referred to as "the optimum timing" $\theta_{BIC}$ at which the maximum output of the engine is obtained as shown in FIG. 13 (a). FIG. 13 (b) shows curves of this characteristic of valve-closing timing obtained with the engine rotational speed Ne set to different values. As indicated by a solid line curve A in FIG. 13 (b), the optimum timing $\theta_{BIC}$ varies depending on the engine rotational speed Ne.

Therefore, if the intake valve-closing timing is held at $\theta_{ICO}$ as indicated by the broken line in the same figure, the optimum timing is obtained at Ne=Ne4. However, at other engine rotational speeds, the maximum output of the engine cannot be obtained. In view of this fact, an internal combustion engine which is capable of changing the valve-closing timing between two points ($\theta_{IC1}$ and $\theta_{IC2}$) has been proposed by Japanese Patent Publication (Kokoku) No. 49-33289. However, in such an engine as well, as indicated by one-dot-chain lines in the figure, it is impossible to obtain the maximum engine output at all engine rotational speeds.

On the other hand, there is a problem that knocking is more liable to occur as larger engine output is obtained. In order to solve this problem, an anti-knocking system for an engine which is capable of changing intake-valve closing timing, has been proposed by Japanese Provisional Utility Model Publication (Kokai) No. 59-159705, in which when knocking is detected, the intake valve-closing timing is changed.

However, according to this system, when knocking ceases to be detected, the intake valve-closing timing is restored to the former timing, so that in the case where a regular gasoline is used for an engine for which a gasoline having a high octane number is suitable, there arises a problem of occurrence of hunting, i.e. a repeated sequence of occurrence of knocking—changing of intake valve-closing timing—ceasing of knocking—restoration of intake valve-closing timing—reoccurrence of knocking.

SUMMARY OF THE INVENTION

It is the object of the invention to provide a method of controlling an internal combustion engine, which is capable of controlling the closing timing of an intake valve or intake valves to optimum timing to thereby improve the engine output, while preventing occurrence of knocking.

To attain the above object, the invention provides a method of controlling an internal combustion engine having at least one intake valve, and means capable of setting at least timing of closing the at least one intake valve as desired.

The method according to a first aspect of the invention is characterized by comprising the steps of:

(1) detecting a demand of the driver to the engine;

(2) detecting operating parameters of the engine including engine rotational speed;

(3) setting the timing of closing the at least one intake valve to timing which makes output of the engine the maximum at the detected engine rotational speed, when it is detected that the driver demands that the maximum output of the engine should be obtained in at least a predetermined operating region of the engine, from results of detections carried out at the steps (1) and (2).

Preferably, the predetermined operating region of the engine is a medium-to-high engine speed region.

More preferably, the operating parameters of the engine include a temperature of the engine, and the method includes the steps of (4) determining whether or not the detected temperature of the engine is in a range higher than a first predetermined value and lower than a second predetermined value which is higher than the first predetermined value, and (5) when the temperature of the engine is determined to be in the range, advancing or retarding the timing of closing the at least one intake valve by a predetermined amount from timing applied when the temperature of the engine is lower than the first predetermined value such that the engine has intake efficiency thereof lowered, in a second predetermined operating region of the engine determined based on at least the detected demand of the driver to the engine and the detected engine rotational speed.

Further preferably, the method includes the step of canceling the advancing or retarding of the timing of closing the at least one intake valve when the detected temperature of the engine becomes lower than the first predetermined value.

Still more preferably, the second predetermined operating region of the engine is a region in which the driver demands that almost the maximum output of the engine should be obtained and at the same time the detected engine rotational speed is higher than a predetermined value.

The method according to a second aspect of the invention is characterized by comprising the steps of:

(1) detecting a demand of the driver to the engine;

(2) detecting operating parameters of the engine including engine rotational speed;

(3) detecting knocking of the engine;

(4) based on results of the detections carried out at the steps (1) to (3), when the knocking of the engine is detected, advancing or retarding the timing of closing the at least one intake valve by a predetermined amount from timing applied before occurrence of the knocking such that the engine has intake efficiency thereof lowered, at least in a predetermined operating region of the engine determined based on at least the detected demand of the driver to the engine and the detected engine rotational speed, and continuing the advancing or retarding of the timing even after the knocking of the engine ceases to occur.

Preferably, the advancing or retarding of the timing is canceled when the operation of the engine is stopped.

Also preferably, the predetermined operating region of the engine is a region in which the driver demands that the medium to maximum output of the engine should be obtained, and at the same time the detected engine rotational speed is lower than a predetermined value.

More preferably, at least one of an amount of fuel supplied to the engine and ignition timing is changed in accordance with the advancing or retarding of the timing, and the changing is canceled in accordance with cancellation of the advancing or retarding of the timing.

The above and other objects, features, and advantages of the invention will become more apparent from the ensuing detailed description taken in conjunction with the accompanying drawings.

BRIEF DESCRIPTION OF THE DRAWINGS

FIG. 7 is a view showing a map (Ti map) for determining the fuel injection period;

FIG. 8 is a view showing a map ($\theta_{IG}$ map) for determining the ignition timing;

FIG. 13 (a) and (b) are graphs showing the relationship between the intake valve closing timing and the engine output;

DETAILED DESCRIPTION

Figure 1:
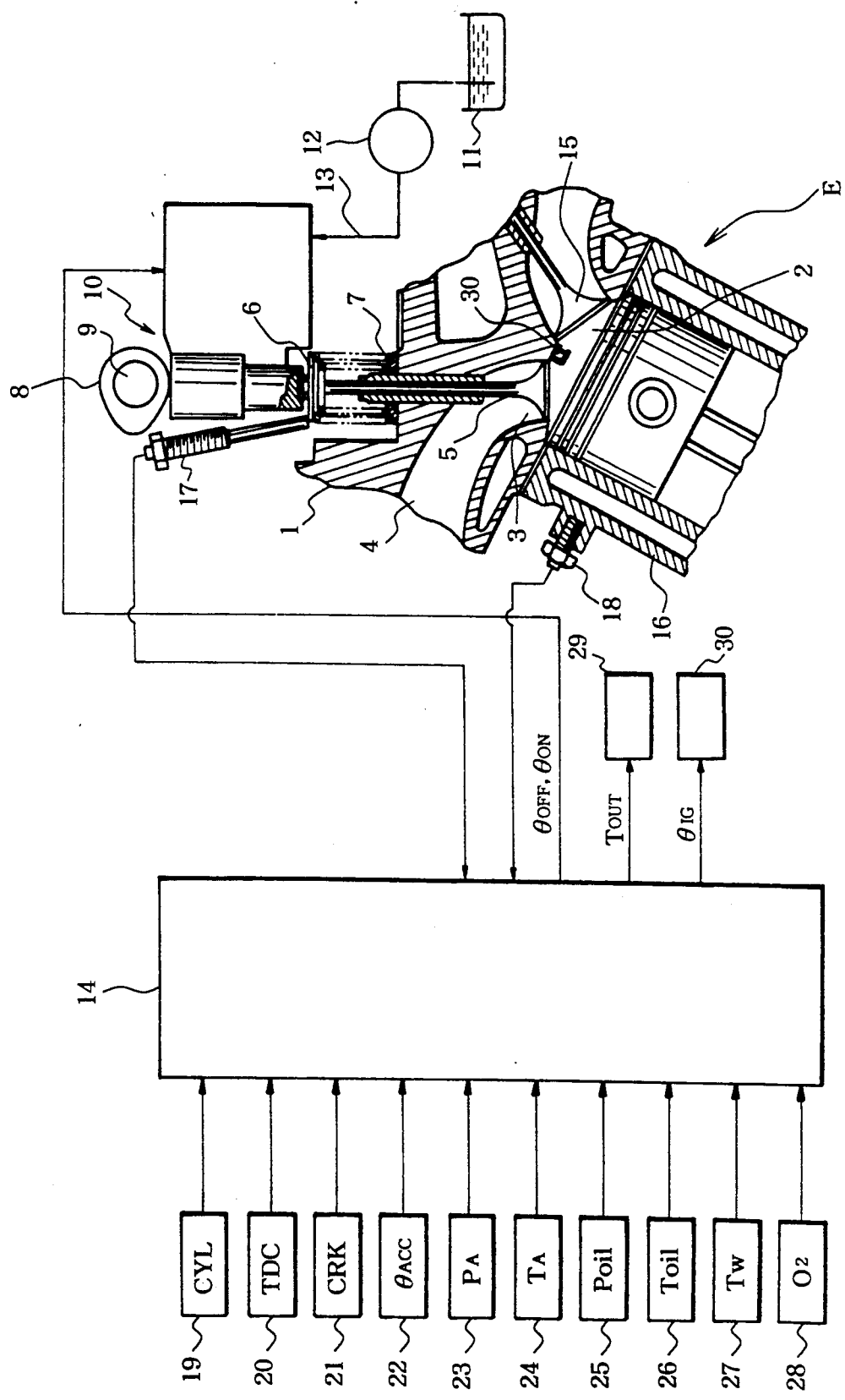
FIG. 1 is a view showing essential parts of an internal combustion engine and a control system therefor to which is applied the control method according to the invention.

The invention will now be described in detail with reference to the drawings showing an embodiment thereof. FIG. 1 shows essential parts of an internal combustion engine and a control system therefor to which is applied the method according to the invention.

In the figure, E designates a four-cylinder type internal combustion engine having a pair of intake valves and a pair of exhaust valves provided for each cylinder. Since a valve-operating device for the intake valves and one for the exhaust valves are identical in construction to each other, the following description only refers to the intake valves and valve-operating device therefor. In addition, the method according to the invention is not limitatively applied to this type of engine, but may be applied to a type e.g. having one intake valve and one exhaust valve provided for each cylinder.

A cylinder head 1 of the engine E has an intake valve port 3 formed therein, one end of which opens into the top of a combustion chamber 2 and the other end communicates with an intake passage 4. An intake valve 5 is arranged in the intake valve port 3 for movement through the cylinder head 1 vertically as viewed in FIG. 1 to open and close the intake valve port 3. A valve spring 7 is interposed between a collar 6 of the intake valve 5 and a surface of the cylinder head I and urges the intake valve 5 upward as viewed in FIG. 1, i.e. in a valve-closing direction.

On the other hand, a camshaft 9 having a cam 8 formed integrally therewith is rotatably arranged above the cylinder head 1. The camshaft 9 is connected to a crankshaft, not shown, via a timing belt, not shown. A hydraulically-driving valve unit 10, described in detail hereinafter, is interposed between each cam 8 and its associated intake valve 5 for each cylinder. Hydraulic fluid is supplied to the hydraulically-driving valve unit 10 from an oil tank 11 via an oil pump 12 and an oil gallery 13. An electronic control unit (hereinafter referred to as "the ECU" 14 supplies a control signal ($\theta_{ON}$, $\theta_{OFF}$) to the unit 10 to control the timing of opening and closing the intake valve 15.

In addition, in the present embodiment, the same valve-operating device, not shown, as the one described above, is provided also for each exhaust valve 15. However, the exhaust valves 15 may be operated by a conventional valve-operating device in a known manner such that they are closed at constant timing in accordance with a cam profile, or may be operated by a variable valve timing mechanism which can set the timing of opening/closing of the exhaust valves to a plurality of values.

A lift sensor 17 is provided in the vicinity of the collar 6 of the intake valve 5 for detecting an lift amount of the intake valve 5, and a knocking sensor 18 is mounted in a cylinder wall 16 for detecting knocking of the engine. Output signals from these sensors are supplied to the ECU 14.

A cylinder-discriminating sensor (hereinafter referred to as "the CYL sensor") 19 is arranged in a holder, not shown, of the camshaft 9 for generating a signal pulse (hereinafter referred to as "the CYL signal pulse") at a predetermined crank angle of a particular cylinder of the engine. Further, arranged in facing relation to a crankshaft, not shown, of the engine are a TDC sensor 20 for generating a TDC signal pulse at each of predetermined crank angles which are in advance of the top dead center (TDC) position of respective cylinders by a predetermined angle whenever the crankshaft rotates through a predetermined angle (180 degrees in the case of a four-cylinder type engine), and a crank angle sensor (hereinafter referred to as "the CRK sensor") 21 for generating one pulse (hereinafter referred to as "the CRK signal pulse") whenever the crankshaft rotates through a predetermined angle (e.g. 20°) which is smaller than the predetermined angle last mentioned with respect to the TDC signal pulse. The sensors 19 to 21 are electrically connected to the ECU 14 for supplying the CYL signal pulse, TDC signal pulse, and CRK signal pulse thereto, respectively. The output signal pulses from these sensors 19, 20, 21 are used for controlling the timing of closing of an intake valve, fuel injection timing, and ignition timing, as well as for detecting the engine rotational speed.

Further electrically connected to the ECU 14 are an accelerator pedal angle (stepping amount) sensor ($\theta_{ACC}$ sensor) 22 as means for detecting the demand of the driver to the engine, an atmospheric pressure sensor ($P_A$ sensor) 23 for detecting atmospheric pressure ($P_A$), an intake air temperature sensor ($T_A$ sensor) 24 for detecting intake air temperature ($T_A$), an oil pressure sensor (Poil sensor) 25 and an oil temperature sensor (Toil sensor) 26 for respectively detecting the pressure (Poil) and temperature (Toil) of hydraulic fluid in the hydraulically-driving valve unit 10, an engine coolant temperature sensor ($T_W$ sensor) 27 for detecting the temperature of coolant in the engine, and an oxygen concentration sensor ($O_2$ sensor) 28 for detecting the concentration of oxygen present in exhaust gases emitted from the cylinders. Respective output signals from these sensors 22 to 28 are supplied to the ECU 14.

Further, the ECU 14 detects an output voltage ($V_B$) of a battery, and starting (i.e. cranking) of the engine by an ON signal outputted from a starter switch 31.

The ECU 14 comprises a central processing unit, memory means, and output circuit for control signals, none of which are shown, and controls the output signal ($\theta_{OFF}$, $\theta_{ON}$) for the hydraulically-driving valve unit 10 in a manner described hereinafter with reference to FIGS. 5, 14, or 16 based on the output signals supplied from the above-mentioned sensors 17 to 28 as well as on the output voltage ($V_B$) of the battery. Further, the ECU 14 determines an amount of fuel to be supplied to the engine (a time period over which fuel injection valves 29 should be opened) $T_{OUT}$ and the timing $\theta_{IG}$ of ignition of the ignition plug 30 to respective optimal values responsive to operating conditions of the engine. The fuel injection valves 29 are each arranged in the intake pipe at a location slightly upstream of the intake passage 4.

Figure 2:
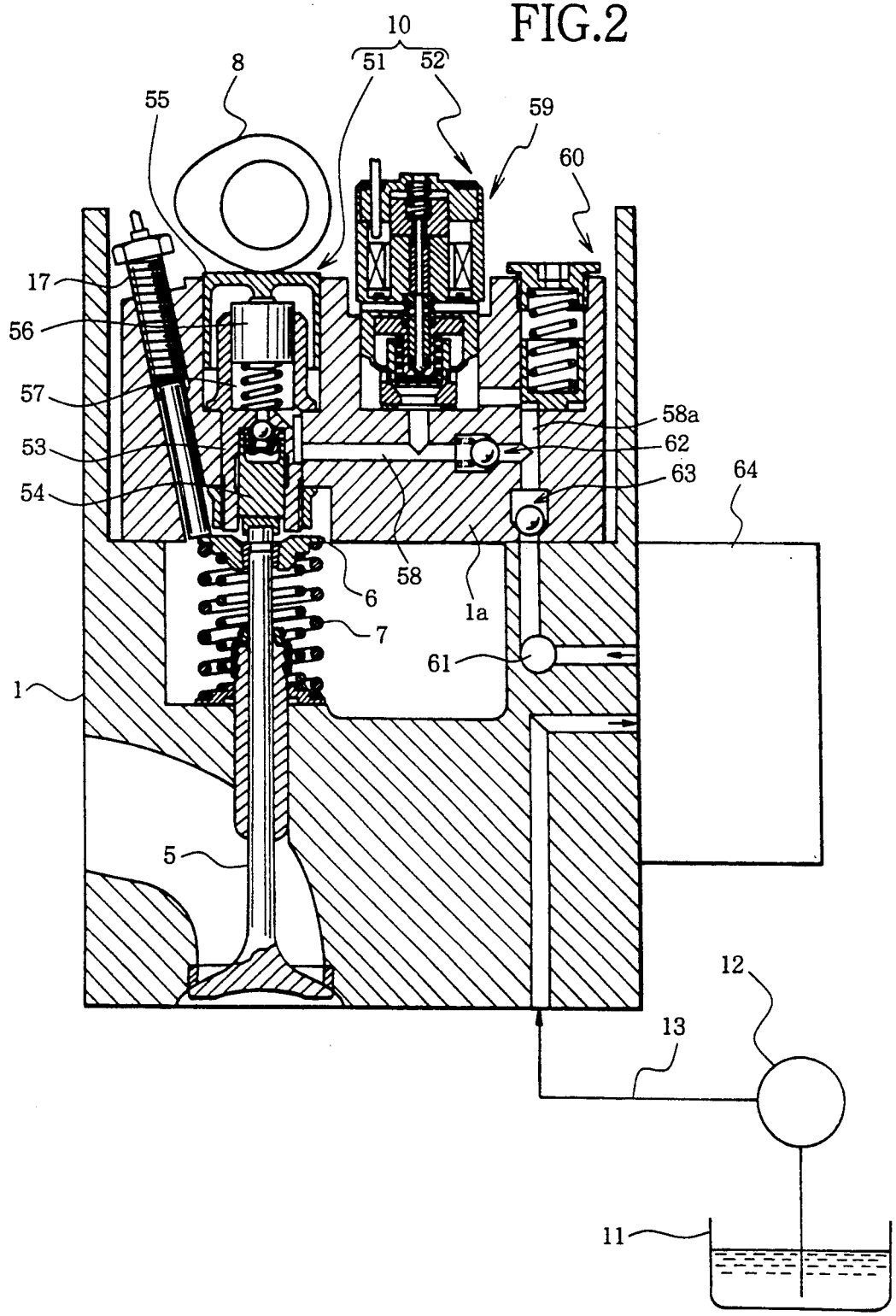
FIG. 2 is a view showing a valve-operating device of the engine in FIG. 1.

The hydraulically-driving valve unit 10 provided for each intake valve of each cylinder comprises, as shown in FIG. 2, a hydraulically-driving mechanism 51 for downwardly moving the intake valve 5 against the force of the valve spring 7 to open and close the intake valve 5 in accordance with the profile of the cam 8, and an oil pressure-releasing mechanism 52 for nullifying the urging force of hydraulic fluid provided by the hydraulically-driving mechanism 51 halfway in the course of valve-opening operation to thereby close the intake valve 5 irrespective of the acting profile of the cam 8.

The hydraulically-driving mechanism 51 comprises, as essential elements, a cylindrical body 53 rigidly mounted in a block 1a forming part of the cylinder head 1, a valve side piston 54 slidably fitted in a lower portion of the cylindrical body 53 with a lower end thereof abutting on an upper end of the intake valve 5, a lifter 55 on which the cam 8 slides, a cam side piston 56 slidably fitted in an upper portion of the cylindrical body 53 with an upper end thereof abutting on the lifter 55, and a hydraulic fluid chamber 57 defined between the cylindrical body 53, the valve side piston 54, and the cam side piston 56. The hydraulically-driving mechanism 51 opens and closes the intake valve 5 in accordance with the profile of the cam 8 when the oil pressure within the hydraulic fluid chamber 57 assumes a value equal to or higher than a predetermined value. The hydraulic fluid chamber 57 communicates with an oil passage 58 formed in the oil pressure-releasing mechanism 52.

On the other hand, the oil pressure-releasing mechanism 52 comprises, as essential elements, the oil passage 58 communicating the hydraulic fluid chamber 57 with an oil-feeding gallery 61, a spill valve 59 arranged at an intermediate portion of the oil passage 58, a feed valve 62 and a check valve 63 arranged in the oil passage 58, and an accumulator 60 for maintaining at a predetermined level oil pressure within an accumulator circuit 58a defined between the feed valve 62, check valve 63, and spill valve 59. The oil-feeding gallery 61 feeds oil pressure to the hydraulically-driving valve unit 10 provided for each intake valve of the cylinder, and is connected to the oil gallery 13 via a pressure-regulating unit 64. The pressure-regulating unit 64 regulates oil pressure created by the oil pump 12 to values within a predetermined range.

Figure 3:
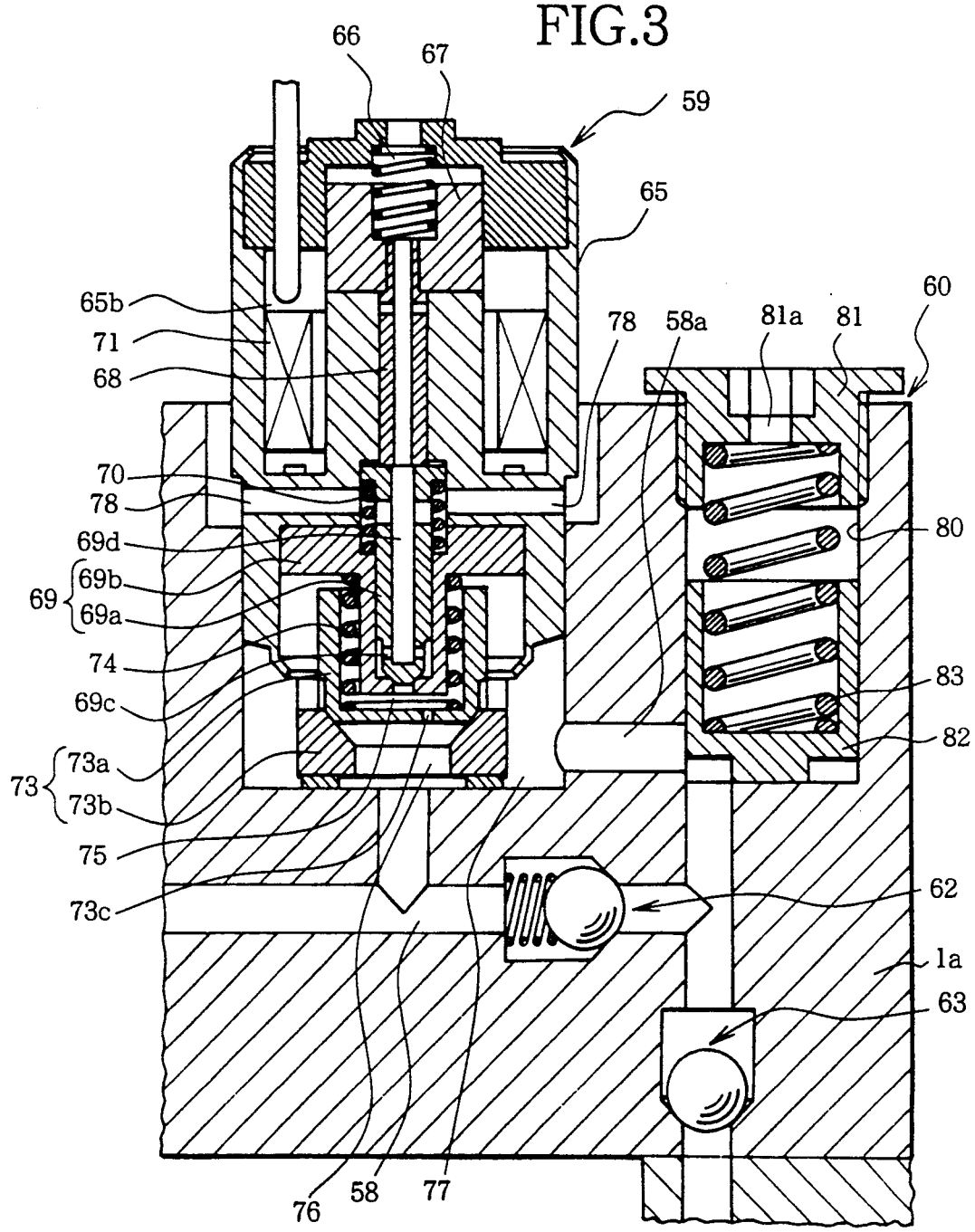
FIG. 3 is a view showing part of FIG. 2 on an enlarged scale.

As shown in FIG. 3, the spill valve 59 comprises, as essential elements, a pilot valve 69 comprising a first valve body 69a and a first valve seat 69b, a main valve 73 comprising a second valve body 73a and a second valve seat 73b, and a solenoid for moving the first valve body 69a. The first valve body 69a is formed integrally with a rod 68 and an armature 67, and slidably fitted in a cylinder hole 66 formed in a housing 65. A spring 70 is interposed between the first valve body 69a and the first valve seat 69b. The first valve body 69a is formed therein with a through hole 69c and an oil passage 69d for leaking hydraulic fluid in an oil pressure chamber 75 via an outlet port 78 when the first valve body 69a is moved upward to open the pilot valve 69. The main valve 73 is arranged below the pilot valve 69 to establish and cut off communication between a first port 76 and a second port 77. A spring 74 is interposed between the second valve body 73a and the first valve seat 69b for urging the second valve body 73a downward. Further the valve body 73a of the main valve 73 is formed therein with a restriction 73c.

The solenoid 71 is arranged in a chamber 65b formed in the housing 65, and connected to the ECU 14.

The accumulator 60, which is provided at an intermediate portion of the accumulator circuit 58a to regulate the oil pressure within the accumulator circuit 58a to a predetermined level, comprises a cylindrical hole 80 formed in the block 1a, a cap 81 formed therein with an air passage 81a, a piston 82 slidably fitted in the cylindrical hole 80, and a spring 83 interposed between the cap 81 and the piston 82.

Next, the operations of the hydraulically-driving mechanism 51 and the oil pressure-releasing mechanism 52 will be described.

Figure 4:
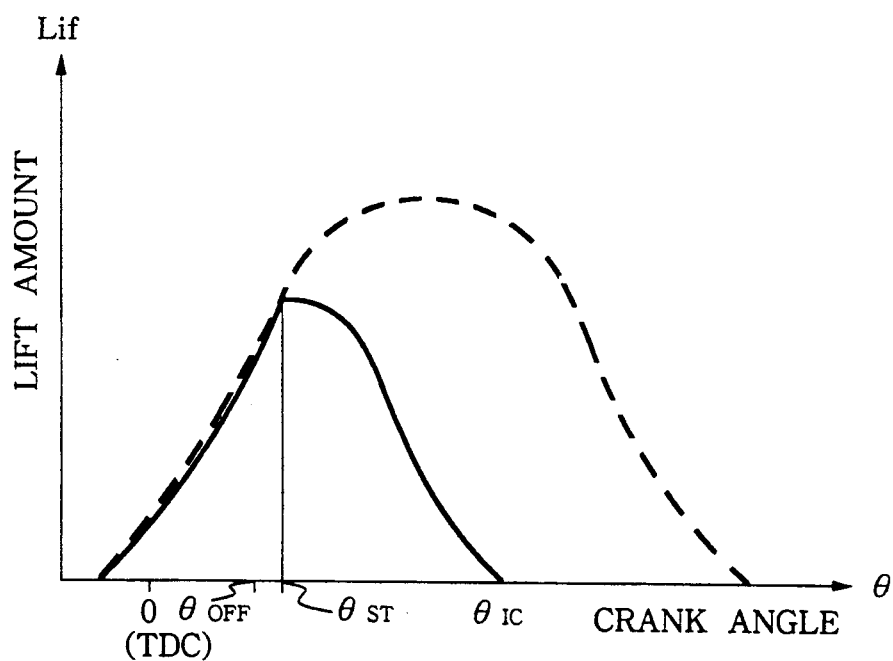
FIG. 4 is a graph showing a characteristic of operation of an intake valve.

When the solenoid 71 is energized by a control signal from the ECU 14, the first valve body 69a of the pilot valve 69 is moved downward together with the armature 67 and rod 68 against the force of the spring 70 to close the pilot valve 69. In this connection, the stroke of the first valve body 69a is so short that, even when the pilot valve is closed, the clearance created between the upper end of the first valve body 69a and the housing 65 is very narrow. At this time, the oil pressure in the first port 76 and that in the oil pressure chamber 75 are made equal to each other, so that the second valve body 73a is urged downward by the force of the spring 74 to close the main valve 73. As a result, the oil pressure within the hydraulic fluid chamber 57 is held at a high level (higher than a predetermined level), and the intake valve 5 is opened and closed in accordance with the profile of the cam 8. In this case, the characteristic of operation of the intake valve (i.e. the relationship between the crank angle $\theta$ and the valve lift amount Lif) is indicated, e.g. by the broken line in FIG. 4.

On the other hand, when the solenoid 71 is deenergized, the force of the spring 70 causes the first valve body 69a to move upward to thereby open the pilot valve 69. This allows the hydraulic fluid in the oil pressure chamber 75 to leak via the oil passage 69d and the outlet port 78, whereby the second valve body 73a is moved upward to open the main valve 73. As a result, the oil pressure within the hydraulic fluid chamber 57 is decreased, so that the intake valve 5 starts to be closed irrespective of the profile of the cam 8. Therefore, if the solenoid 71 is deenergized e.g. at a crank angle $\theta_{OFF}$ in FIG. 4, there can be obtained the characteristic of operation of the intake valve as indicated by the solid line therein. Incidentally, there is a slight time lag between the time point (i.e. $\theta_{OFF}$) the solenoid 71 is deenergized and the time point ($\theta_{ST}$) the intake valve 5 actually starts to be closed.

As described above, the solenoid 71 is energized and deenergized by the control signal from the ECU 14, and therefore it is possible to set the valve-closing timing of the intake valve 5 to desired timing or to stop the operation of the intake valve 5 by nullifying the action of the hydraulically-driving mechanism 51 by deenergizing the solenoid 71. Thus, the amount of intake air supplied to each cylinder can be controlled by the control signal from the ECU 14.

Figure 5A:
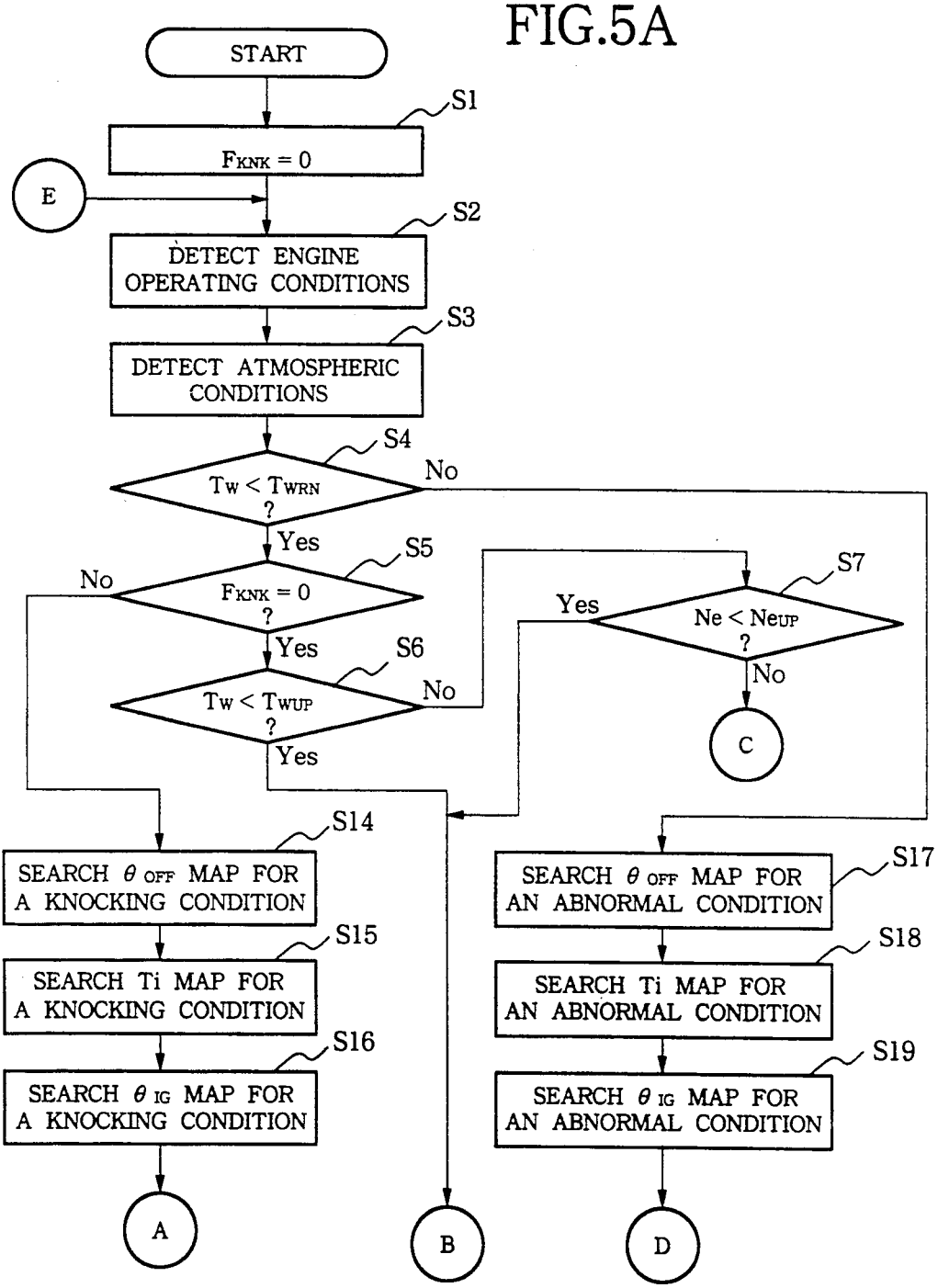
FIG. 5 is a flowchart showing the manner of controlling the timing of starting the closing of the intake valve, the fuel injection period, and the ignition timing.
Figure 5B:
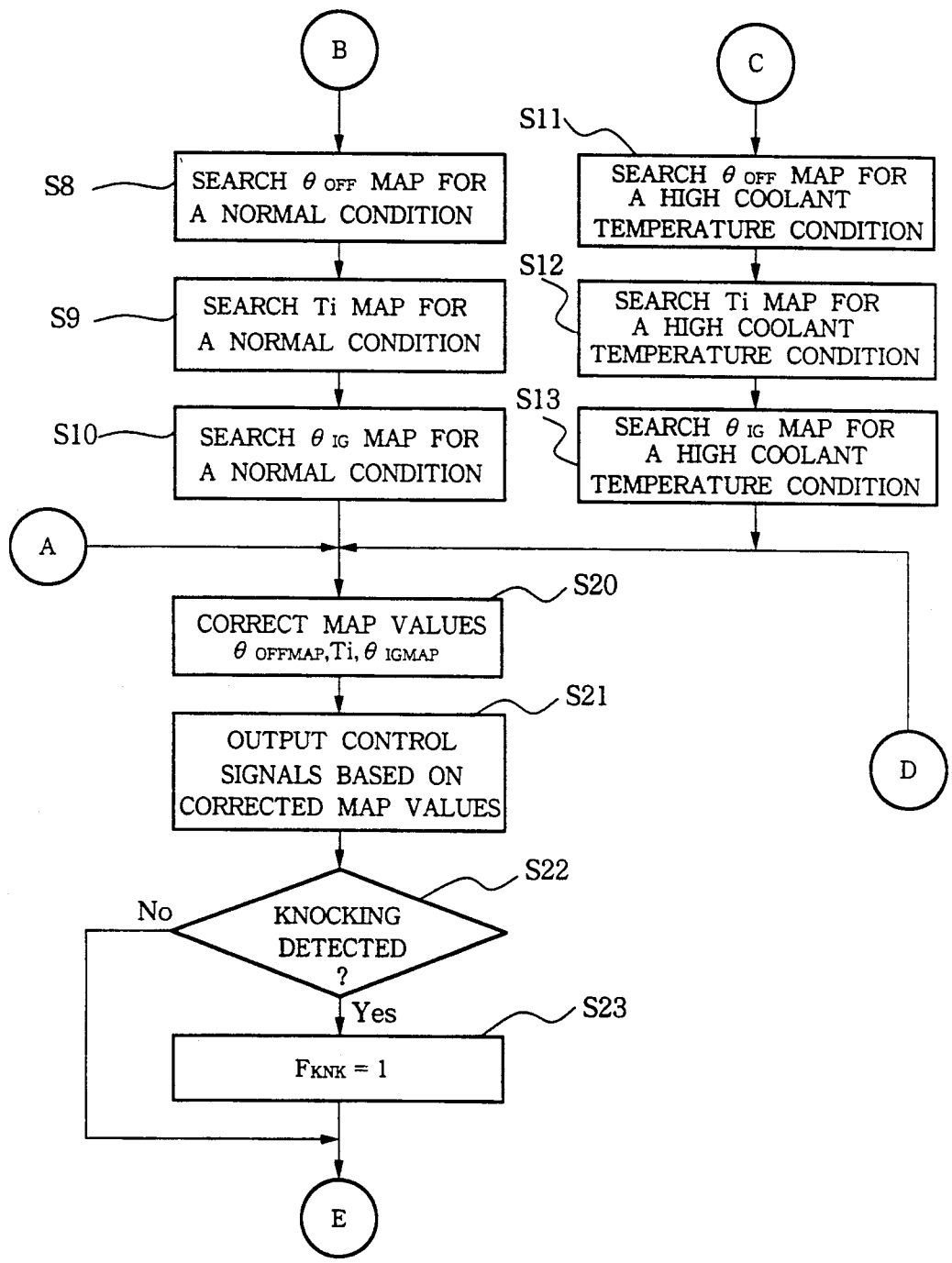

FIG. 5 shows a program for controlling the timing (hereinafter referred to as "OFF timing" $\theta_{OFF}$ for giving an instruction for starting the closing of the intake valve 5, the fuel injection period $T_{OUT}$, and the ignition timing $\theta_{IG}$.

When the engine is started, a knocking flag $F_{KNK}$, which is set to a value of 1 when the knocking sensor 18 detects knocking of the engine, is set to 0 at a step S1. Then the output signals from the aforementioned sensors are read to thereby detect engine operating conditions and atmospheric conditions, at steps S2 and S3, respectively.

Figure 6:
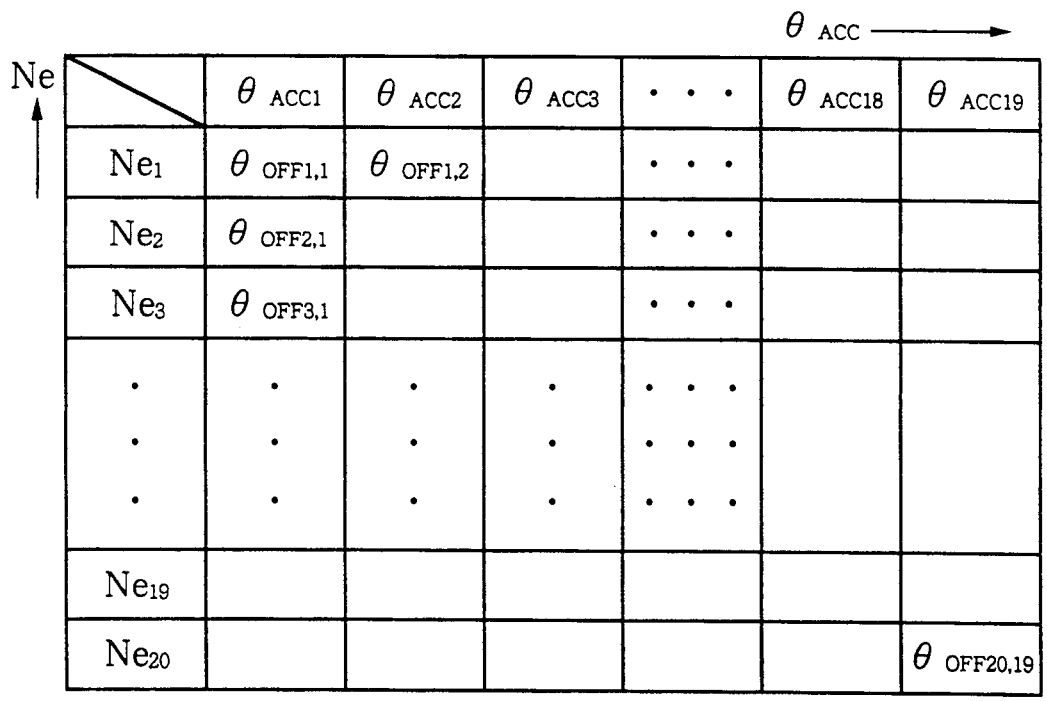
FIG. 6 is a view showing a map ($\theta_{OFF}$ map) for determining the timing of starting the closing of the intake valve.

At a step S4, it is determined whether or not the engine coolant temperature $T_W$ is lower than a first predetermined value $T_{WRN}$ (e.g. 120° C.) for determining an abnormally high coolant temperature region. If the answer to this question is affirmative (Yes), i.e. if $T_W < T_{WRN}$, it is determined at a step S5 whether or not the knocking flag $F_{KNK}$ assumes a value of 0. If the answer to this question is affirmative (Yes) (the answer to this question is necessarily affirmative immediately after the start of the engine), it is determined at a step S6 whether or not the engine coolant temperature $T_W$ is lower than a second predetermined value $T_{WUP}$ (e.g. 110° C.) for determining a high coolant temperature region. If the answer to this question is negative (No), i.e. if $T_W \geq T_{WUP}$, it is determined at a step S7 whether or not the engine rotational speed Ne is lower than a predetermined value $Ne_{UP}$ (e.g. 4000 rpm). If the answer to the question of the step S6 or that of the step S7 is affirmative (Yes), i.e. if $T_W < T_{WUP}$ or $Ne < Ne_{UP}$, a $\theta_{OFF}$ map, a Ti map, and a $\theta_{IG}$ map for a normal condition of the engine are searched in accordance with the detected engine rotational speed Ne and accelerator pedal angle $\theta_{ACC}$ to thereby read values set in the respective maps at steps S8 to S10. The $\theta_{OFF}$ map, Ti map, and $\theta_{IG}$ map, which are stored in the memory means of the ECU, contain, respectively, basic values of the OFF timing $\theta_{OFF}$, fuel injection period $T_{OUT}$, and ignition timing $\theta_{IG}$ set in accordance with the accelerator pedal angle $\theta_{ACC}$ and the engine rotational speed Ne. These maps are previously set, e.g. as shown in FIGS. 6 to 8, as a function of the engine rotational speed Ne and the accelerator pedal angle $\theta_{ACC}$ such that the engine rotational speed Ne is divided into 20 predetermined values Nei within a range of 500 to 8000 rpm, while the accelerator pedal angle $\theta_{ACC}$ is divided into 20 predetermined values $\theta_{ACCj}$ within a range between the fully-stepped position and fully-released position, whereby map values $\theta_{OFFi}$, j, Tii, j, and $\theta_{IGi}$, j corresponding to the lattice points determined by the above predetermined values Nei and $\theta_{ACCj}$ are stored. Map values corresponding to values of the engine rotational Ne and the accelerator pedal angle $\theta_{ACC}$ other than the lattice points are calculated by a four-point interpolation.

Here, map values $\theta_{OFFMAP}$ of the OFF timing $\theta_{OFF}$ in a map region corresponding to conditions of the engine that the accelerator pedal is fully stepped on and at the same time the engine rotational speed Ne is in a medium-to-high speed range (e.g. higher than 3000 rpm) are set to OFF timing $\theta_{OFFBT}$ (e g. corresponding to the solid line in FIG. 13 (b)) which is the optimum timing $\theta_{BIC}$ of the valve-closing timing $\theta_{IC}$ of the intake valve for obtaining the maximum output of the engine to thereby enable the engine to exhibit its performance to the full degree. On the other hand, outside this region, map values $\theta_{OFFMAP}$ are set to OFF timing deviated from the optimum timing $\theta_{OFFBT}$. By thus setting the map values for OFF timing, it is possible to improve the operating efficiency of the engine while avoiding occurrence of knocking e.g. under a high-load low-engine rotational speed condition of the engine without retarding the ignition timing.

In addition, the map values $\theta_{OFFMAP}$ are set to such values applicable on the assumption that the engine is in a standard operating condition in which corrections by multiplying terms and an addition/subtraction term, referred to hereinafter, are not actually carried out (i.e. multiplying terms=1.0, addition/subtraction term=0).

Figure 9:
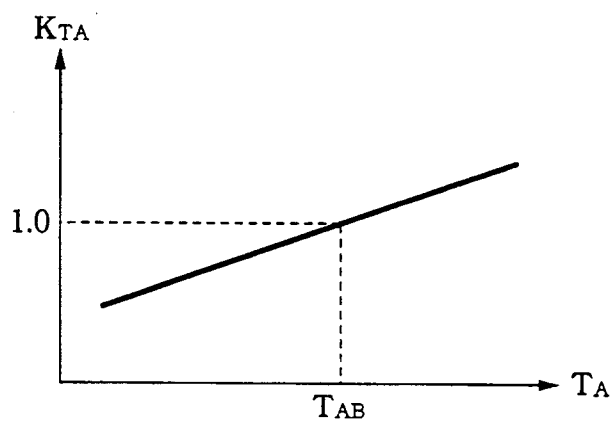
FIG. 9 is a graph showing a table for determining an intake air temperature-dependent correction coefficient ($K_{TA}$)
Figure 10:
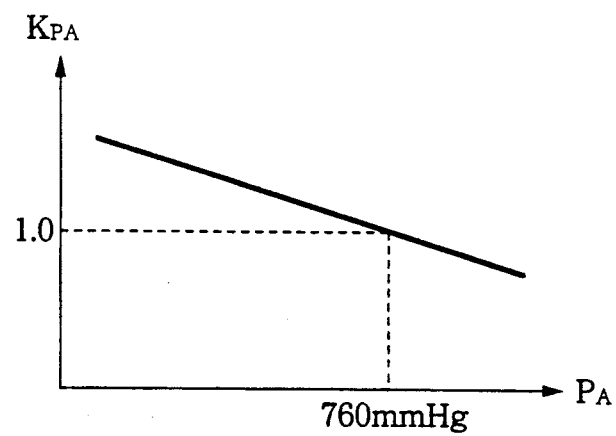
FIG. 10 is a graph showing a table for determining an atmospheric pressure-dependent correction coefficient ($K_{PA}$)

Referring back to FIG. 5, at a step S20, each of the map values $\theta_{OFFMAP}$, Ti, and $\theta_{IGMAP}$ obtained at the respective steps S8 to S10 is corrected in the following manner:

The OFF timing $\theta_{OFF}$ is corrected by the following equation (1):

$$\theta_{OFF} = \theta_{OFFMAP} \times K_{TA} \times K_{PA} \times K_1 + \theta_{ADJ1n} \qquad (1)$$

where $K_{TA}$ represents an intake air ($T_A$)-dependent multiplying term, $K_{PA}$ an atmospheric pressure ($P_A$)-dependent multiplying term, $K_1$ other multiplying terms dependent on oil temperature (Toil), oil pressure (Poil), etc., and $\theta_{ADJ1n}$ (n = 1 to 4 in the case of a four-cylinder type engine) a feedback addition/subtraction term calculated for each cylinder based on the output signal from the lift sensor 17. Among the above-mentioned multiplying terms, $K_{TA}$ compensates for variations in the density of intake air resulting from variations in the intake air temperature $T_A$, and is determined in accordance with a $T_A-K_{TA}$ table shown in FIG. 9 by a detected value of the intake air temperature $T_A$, and $K_{PA}$ compensates for variations in the density of intake air resulting from variations in the atmospheric pressure $P_A$, and is determined in accordance with a $P_A-K_{PA}$ table shown in FIG. 10 by a detected value of the atmospheric pressure $P_A$. The multiplying terms $K_{PA}$, $K_{TA}$, and $K_1$ are provided for the following reason: First, the control of the valve-closing timing of the intake valve 5 is carried out for the purpose of controlling the amount of intake air supplied to each cylinder to values optimum for engine operating conditions to thereby control the air-fuel ratio (A/F) to a desired value (e.g. stoichiometric ratio). Therefore, it is necessary to effect atmospheric pressure-dependent correction and/or intake air temperature-dependent correction to compensate for the influence of the atmospheric pressure ($P_A$) and the intake air temperature ($T_A$) on the amount of intake air. Secondly, since the hydraulically-driving valve unit 10 is controlled by oil pressure, it is necessary to compensate for the influence of the oil temperature (Toil) and the oil pressure (Poil) on the operation of the unit 10 per se.

The feedback addition/subtraction term $\theta_{ADJ1n}$ is a correction term for absorbing errors caused by errors in assembly of each valve-operating device on each cylinder and variations in operating characteristics thereof resulting from manufacturing errors, and is determined by comparing a time point the intake valve of each cylinder actually starts to be closed with a timing instruction signal for starting the closing of the intake valve (signal indicative of OFF timing $\theta_{OFF}$).

Figure 11:
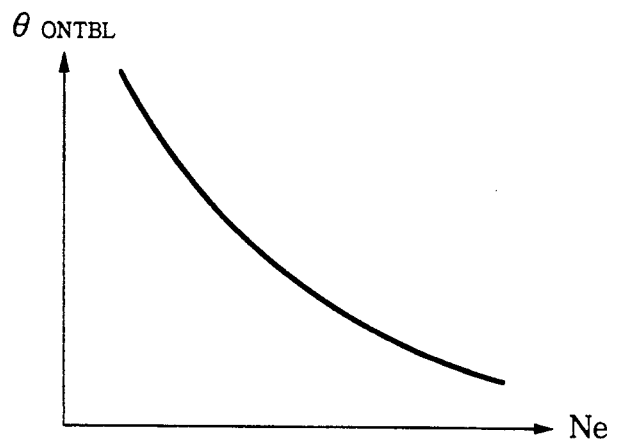
FIG. 11 is a graph showing a table for determining ON timing ($\theta_{ON}$) for turning on a solenoid of a spill valve 59 appearing in FIG. 2.
Figure 12:
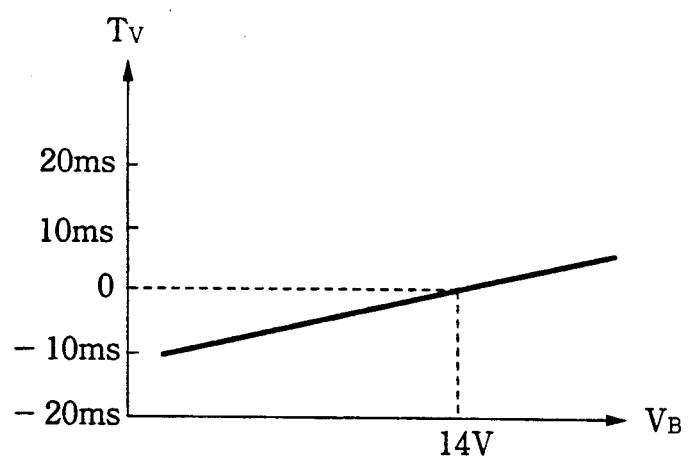
FIG. 12 is a graph showing a table for determining a battery voltage ($V_B$)-dependent correction variable ($T_V$)

In this connection, the timing for closing the spill valve 59, i.e. timing (hereinafter referred to as "ON timing") $\theta_{ON}$ for energizing the solenoid 71 to make effective the action of the hydraulically-driving mechanism 51 is determined by the following equation:

$$\theta_{ON} = \theta_{ONTBL} + \theta_V \quad (2)$$

where $\theta_{ONTBL}$ represents a basic value read out in accordance with the engine rotational speed Ne, e.g. from a $Ne-\theta_{ON}$ table shown in FIG. 11, and $\theta_V$ a battery-dependent correction variable which is dependent on the battery voltage $V_B$. The $Ne-\theta_{ON}$ table is set such that the basic value $\theta_{ONTBL}$ assumes a smaller value as the engine rotational speed Ne increases. Therefore, as the engine rotational speed is higher (so that the time period per engine cycle is shorter), the crank angle at which the spill valve 59 starts to be closed is more advanced. This makes it possible to make constant the time period from the closing of the spill valve to the next start of intake stroke (the next start of opening of the intake valve 5) (i.e. the time period required for oil pressure within the hydraulic fluid chamber 57 of the hydraulically-driving mechanism 51 to reach a level necessary for opening the intake valve 5), irrespective of the engine rotational speed Ne. Further, the battery-dependent correction variable $\theta_V$, which is obtained by time-to-angle conversion in accordance with the engine rotational speed of a time period $T_V$ read from a $V_B-T_V$ table shown in FIG. 12, compensates for degradation in responsiveness of closing operation of the spill valve 59 due to a drop in the battery voltage $V_B$. In the $V_B-T_V$ table, the time value $T_V$ assumes a larger value as the battery voltage $V_B$ is higher. By thus setting the value of $T_V$, even when the battery voltage $V_B$ drops to lower the responsiveness of opening and closing operation of the spill valve 59, a predetermined level of oil pressure starts to be supplied to the hydraulic fluid chamber 57 of the hydraulically-driving mechanism 51 at an early time, to thereby enable positive opening operation of the intake valve 5 in the next intake stroke.

The fuel injection period $T_{OUT}$ is calculated by correcting the map value Ti by the following equation (3):

$$T_{OUT} = Ti \times K_{TW} \times K_{AST} \times K_{O2} \times K_2 + T_{ACC} + T_V$$

where $K_{TW}$ represents a coolant temperature-dependent correction coefficient which is set to a larger value as the engine coolant temperature $T_W$ is lower, $K_{AST}$ an after-start fuel increasing coefficient which is determined depending on starting conditions of the engine, $K_{O2}$ an air-fuel ratio correction coefficient which is calculated based on an output signal from the $O_2$ sensor 28 such that the air-fuel ratio of the mixture assumes a stoichiometric value (14.7), $K_2$ other correction coefficients set to desired values based on other parameters indicative of operating conditions of the engine, and $T_{ACC}$ and $T_V$ are an acceleration-dependent correction variable and a battery-dependent correction variable, respectively, the former being set based on a rate of change $\Delta\theta_{ACC}$ in the accelerator pedal angle $\theta_{ACC}$ while the latter being set to based on the output voltage of the battery.

In this connection, when calculating $T_{OUT}$, corrections dependent on atmospheric pressure $P_A$ and the intake air temperature $T_A$ are not carried out. This is because in the above described control of the intake air amount (control of timing of opening and closing the intake valve 5), the amount of intake air has already been corrected by atmospheric pressure and intake air temperature, so that the substantial mass of intake air supplied to the engine assumes a value free from the influence of variations in atmospheric pressure and intake air temperature.

The ignition timing $\theta_{IG}$ is determined by correcting the map value $\theta_{IGMAP}$ by the following equation (4):

$$\theta_{IG} = \theta_{IGMAP} + \theta_{TW} + \theta_{CR} \quad (4)$$

where $\theta_{TW}$ represents a coolant temperature-dependent variable determined based on an output signal from the $T_W$ sensor 27, and $\theta_{CR}$ angle-advancing/retarding correction variables based on other parameters (e.g. intake air temperature $T_A$) indicative of operating conditions of the engine.

Referring back to FIG. 5, at a step S21, control signals are outputted based on the values $\theta_{OFF}$ ($\theta_{ON}$), $T_{OUT}$, and $\theta_{IG}$ obtained at the step S20, to thereby operate the spill valve 59 of the oil pressure-releasing mechanism 52, fuel injection valve 29, and ignition plug 30, respectively. Then at a step 22, it is determined whether or not the knocking sensor 18 has detected knocking of the engine. If the answer to this question is negative (No), the program immediately returns to the step S2, whereas if the answer is affirmative (Yes), the program proceeds to a step S23 where the knocking flag $F_{KNK}$ is set to 1, followed by returning to the step S2.

On the other hand, if both of the answers to the questions of the steps S6 and S7 are negative (No), i.e. if $T_W \geq T_{TWUP}$ and $Ne \geq Ne_{UP}$, a $\theta_{OFF}$ map, a Ti map, and a $\theta_{IG}$ map for a high coolant temperature condition of the engine are searched in accordance with the detected engine rotational speed Ne and accelerator pedal angle $\theta_{ACC}$ to thereby read values set in the respective maps at steps S11 to S13, followed by the program proceeding to the step S20.

The $\theta_{OFF}$ map, Ti map, and $\theta_{IG}$ map for a high coolant temperature condition of the engine are employed when the engine coolant temperature $T_W$ assumes a value higher than approx. 110° C. for avoiding so-called high speed knocking which is liable to occur in a high load medium-to-high engine speed region. Each map has set map values thereof corresponding to a range higher than the predetermined value $Ne_{UP}$ with respect to the engine rotational speed Ne, and to a range from the fully-stepped position to the fully-released position with respect to the accelerator pedal angle $\theta_{ACC}$. Moreover, in the $\theta_{OFF}$ map for a high coolant temperature condition, map values corresponding to a region where the accelerator pedal angle is in the vicinity of the fully-stepped position are shifted to values which cause the intake efficiency of the engine lower than that caused by the corresponding map values in the $\theta_{OFF}$ map for a normal condition. More specifically, the $\theta_{OFF}$ map for a high coolant temperatures condition is prepared by adding or subtracting a predetermined amount to or from the values set in the $\theta_{OFF}$ map for a normal condition to thereby advance or retard the timing such that the intake efficiency of the engine is lowered. Further, the Ti map for a high coolant temperature condition is set in correspondence to the $\theta_{OFF}$ map for a high coolant temperature condition, such that the map values assume values which cause the air-fuel ratio to be equal to or slightly richer than the air-fuel ratio obtained when the map for a normal condition is used. The $\theta_{IG}$ map for a high coolant temperature condition is set such that the map values assume values which cause the ignition timing to be equal to or slightly retarded from timing which gives the maximum torque (hereinafter referred to as "MBT").

By employing the maps for a high coolant temperature condition, it is possible to avoid so-called high speed knocking, and moreover to obtain better fuel consumption compared with a case where knocking is prevented by the cooling effect of fuel by increasing the fuel injection amount.

On the other hand, if the answer to the question of the step S5 is negative (No), i.e. if $F_{KNK}=1$, which means that the knocking sensor 18 has detected knocking of the engine, a $\theta_{OFF}$ map, a Ti map, and a $\theta_{IG}$ map for a knocking condition of the engine are searched in accordance with the detected engine rotational speed Ne an accelerator pedal angle $\theta_{ACC}$ to thereby read values set in the respective maps at steps S14 to S16, followed by the program proceeding to the step S20.

The $\theta_{OFF}$ map, Ti map, and $\theta_{IG}$ map for a knocking condition, which have set map values thereof corresponding to the same ranges of the engine rotational speed and the accelerator pedal angle as the maps for a normal condition, are provided for avoiding knocking which occurs when the maps for a normal condition, which are intended for use on the assumption that a gasoline having a high octane number is used, are used although a regular gasoline is actually used. Moreover, in the $\theta_{OFF}$ map for a knocking condition, map values corresponding to a region where the accelerator pedal angle is equal to or greater than a half-stepped position and at the same time the engine rotational speed is medium or low (e.g. equal to or lower than 4000 rmp) are shifted to values which cause the intake efficiency of the engine lower than that caused by the corresponding map values in the $\theta_{OFF}$ map for a normal condition.

More specifically, the $\theta_{OFF}$ map for a knocking condition is prepared by adding or subtracting a predetermined amount to or from the values set in the $\theta_{OFF}$ map for a normal condition as values corresponding to the medium-to-high load medium-to-low engine speed region to thereby advance or retard the timing such that the intake efficiency of the engine is lowered. That is, the map values are set as above in consideration of the tendency that knocking occurs due to the use of an unsuitable gasoline as mentioned above in the medium-to-high load medium-to-low engine speed region to avoid this inconvenience. In this connection, in the medium-to-high load high engine speed region in which knocking is inherently liable to occur, as well, the map values are set such that the intake efficiency of the engine is lowered. Further, in this embodiment, once knocking of the engine has been detected to set the knocking flag $F_{KNK}$ to 1, the $\theta_{OFF}$ map for a knocking condition continues to be used unless the engine coolant temperature becomes abnormally high ($T_W \geq T_{WRN}$) or the ignition switch is turned off to stop the engine. This makes it possible to prevent occurrence of the above-described hunting due to alternate occurrence of knocking state and non-knocking state when the regular gasoline s used for the engine for which a gasoline having a high octane number is suitable. In other words, even if a wrong gasoline is used, it is possible to prevent occurrence of knocking by changing the intake air amount (i.e. OFF timing) to a value suitable for the used gasoline to thereby improve the stability of control and prolong the life of the engine.

Further, once the ignition switch has been turned off, the knocking flag $F_{KNK}$ is reset to 0, and therefore, when the gasoline is changed to a high-octane gasoline, it is possible to restore the control by the use of the $\theta_{OFF}$ map for a normal condition.

Further, the map values of the Ti map and $\theta_{IG}$ map for a knocking condition are set such that they are suitable for the intake air amount based on the $\theta_{OFF}$ map for a knocking condition, whereby even when the $\theta_{OFF}$ map for a knocking condition is used, the air-fuel ratio is controlled to the same value as when the $\theta_{OFF}$ map for a normal condition is used, and at the same time the ignition timing is controlled to a value equal to or slightly retarded from MBT.

If the answer to the question of the step S4 is negative (No), i.e. $T_W \geq T_{WRN}$, which means that the engine coolant temperature is abnormally high, a $\theta_{OFF}$ map, a Ti map, and a $\theta_{IG}$ map for an abnormal condition detected engine rotational speed Ne and accelerator pedal angle $\theta_{ACC}$ to thereby read values set in the respective maps at steps S17 to S19, followed by the program proceeding to the step S20.

The $\theta_{OFF}$ map for an abnormal condition is provided for reducing load on the engine, and set such that the minimum amount of intake air required for the vehicle to travel to a repair shop is supplied to the engine. Further, the Ti map and $\theta_{IG}$ map for an abnormal condition need not be such that map values thereof are optimum for the OFF timing $\theta_{OFF}$, but the map values may be constant, for example.

Thus, when the engine coolant temperature $T_W$ is abnormally high, the maps for an abnormal condition are used to thereby lower the engine coolant temperature to a value as low as possible while making it possible for the vehicle to travel to a repair shop.

In addition, in the present embodiment, when knocking of the engine has been detected or when the engine coolant temperature is abnormally high, the maps to be used are changed to thereby change the OFF timing $\theta_{OFF}$, fuel injection period $T_{OUT}$, and ignition timing $\theta_{IG}$. However, this is not limitative, but the control amounts may be changed by correction terms for a knocking condition and a high engine coolant temperature condition.

Further, although in the present embodiment, the demand of the driver to the engine is detected by the accelerator pedal angle ($\theta_{ACC}$) sensor, this is not limitative, but the demand may be detected by the use of another parameter such as throttle valve opening ($\theta_{TH}$).

The valve-operating device for hydraulically driving intake or exhaust valves as described hereinabove with reference to FIGS. 1 to 3 does not operate when the pressure of hydraulic fluid is low. Therefore, when the engine is started, there arises the following problem:

When the engine is in stoppage, the pressure of the hydraulic fluid is low, so that when the engine is started, there is a time lag before the pressure of the hydraulic fluid rises to a level high enough to operate the valve-operating device. More specifically, there is a time lag between starting of the starting operation of the engine and starting of a regular intake or exhaust valve operation, which is caused by a delayed supply of the hydraulic fluid, which depends on the viscosity of the hydraulic fluid, configurations of oil passages, performance of the oil pump, etc. Therefore, immediately after the starting operation of the engine is started, the intake or exhaust valve does not operate at all or the lift amount thereof is small, so that fuel injected into the intake pipe stays in the intake passage or forms an excessively rich mixture which is drawn into the cylinder, thus causing degradation in the startability or exhaust gas emission characteristics at the start of the engine.

Figure 14:
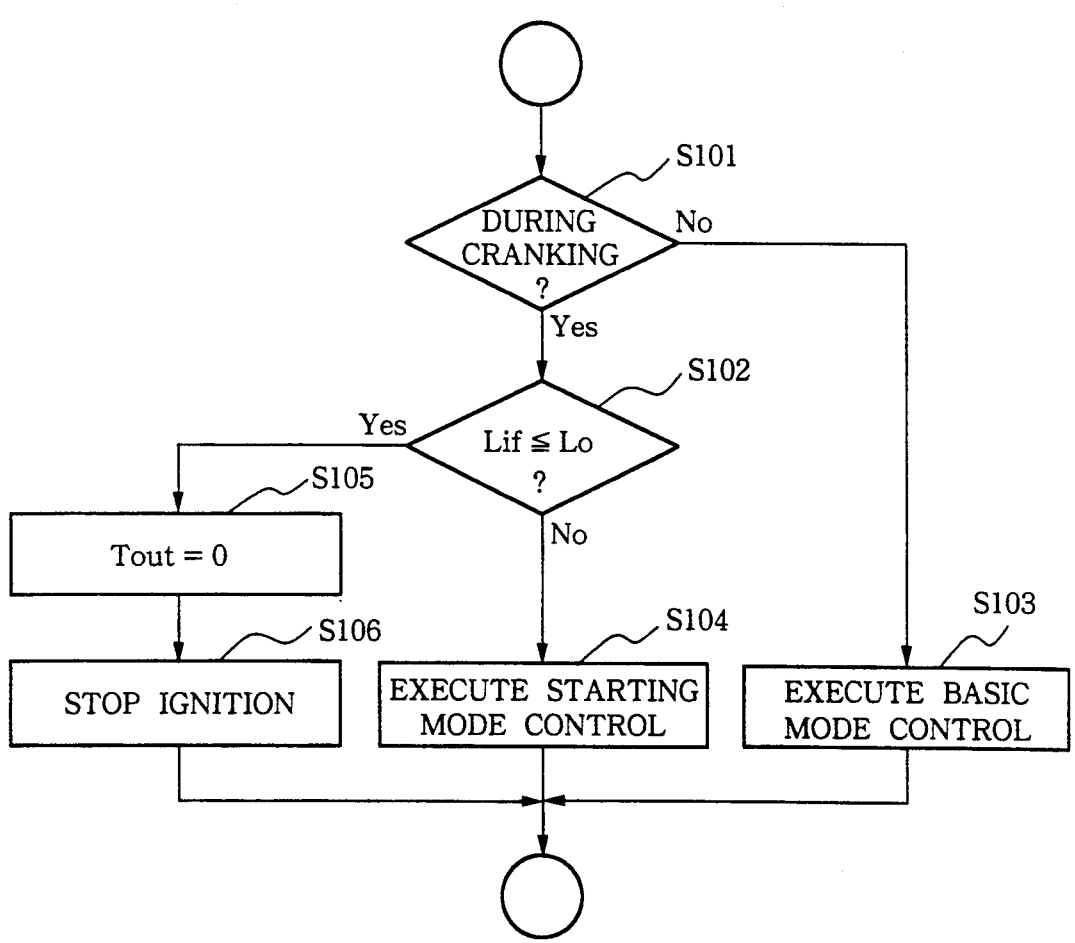
FIG. 14 is a flowchart showing the manner of controlling the fuel supply amount and the ignition timing when the engine is being started.

FIG. 14 shows a program for determining the fuel injection amount $T_{OUT}$ and ignition timing $\theta_{IG}$ when the engine is started, in order to solve the above-mentioned problem.

At a step S101, it is determined whether or not the engine is being cranked (started). This determination is carried out, in this program, by determining whether or not the starter switch 31 has been turned on. However, this is not limitative, but the determination may be carried out by determining whether or not the engine rotational speed is equal to or lower than a predetermined value, or whether or not the current consumption of the battery is equal to or higher than a predetermined value, or whether or not the position of a starter rack is in a cranking position.

If the answer to the question of the step S101 is negative (No), i.e. if the engine is not being cranked, the program proceeds to a step S103, where basic mode control is carried out. In the basic mode control, basic values of the fuel injection period $T_{OUT}$ and the ignition timing $\theta_{IG}$ are read from maps in which map values are set with reference to the engine rotational speed Ne and the accelerator pedal angle $\theta_{ACC}$, and the basic values are corrected by correction terms determined based on control signals from the various sensors to thereby obtain the fuel injection period $T_{OUT}$ and ignition timing $\theta_{IG}$, by the use of aforesaid the questions (3), (4), for example. The fuel injection valves 29 and the ignition plugs 30 are supplied with driving signals corresponding to the thus obtained fuel injection period $T_{OUT}$ and ignition timing $\theta_{IG}$.

If the answer to the question of the step S101 is affirmative (Yes), it is determined at a step S102 whether or not the detected lift amount Lif is equal to or smaller than a predetermined value Lo. If the answer to this question is affirmative (Yes), i.e. if Lif≦Lo, which means that the intake valve 5 is not opened at all or slightly opened so that suction of the mixture into the cylinder is not carried out at all or insufficiently carried out, the fuel supply and the supply of a control signal for ignition to the ignition plug are inhibited (steps S105 and S106).

This makes it possible to prevent fuel injected into the intake passage 4 from remaining stagnant therein to thereby degrade the startability of the engine and exhaust gas emission characteristics. Further, by simultaneously stopping the supply of the signal for ignition as above, the consumption of the battery can be reduced.

If the answer to the question of the step S102 is negative (No), i.e. if Lif>Lo, which means that a sufficient lift amount of the intake valve 5 is obtained, the program proceeds to a step S104, where starting mode control is carried out. In the starting mode control, a basic value of the fuel injection period $T_{OUT}$ set in accordance with the engine coolant temperature $T_W$ is corrected by correction terms based on the engine rotational speed Ne and the battery voltage to thereby obtain the fuel injection period $T_{OUT}$, while the ignition timing $\theta_{IG}$ is set to timing more advanced than in the basic mode control. This makes it possible to carry out fuel supply and ignition suitable for starting conditions of the engine until completion of cranking after a sufficient lift amount of the intake valve has become obtained, to thereby achieve excellent startability.

Further, in this program, the determination as to whether or not a sufficient lift amount of the intake valve is obtained is carried out based on an output signal from the lift sensor 17. However, this is not limitative, but it may be carried out by detecting an amount of intake air and determining whether or not the detected amount of intake air is equal to or larger than a predetermined value, or by determining whether or not the engine rotational speed is equal to or higher than a predetermined value, or by determining whether or not the oil pressure detected by the oil pressure sensor 25 is equal to or higher than a predetermined level.

A valve-operating device for an engine having a pair of intake valves or a pair of exhaust valves provided for each cylinder has been proposed by Japanese Provisional Patent Publication (Kokai) No. 61-19911, in which one of the intake valves or one of the exhaust valves is stopped depending on the engine rotational speed. Another valve-operating device has been proposed by Japanese Provisional Utility Model Publication (Kokai) No. 1-61411, in which part of a plurality of intake valves provided for each cylinder is/are driven by cam means, while the rest is/are hydraulically driven, the latter being selectively operated or stopped depending on operating conditions of the engine.

However, in these conventional valve-operating devices, always the same valve(s) is/are inhibited from operating, which causes the other valve(s) to be constantly used, i.e. operated at a frequency of use much higher than the valve(s) occasionally inhibited from operating, and hence causes the former to be worn more rapidly than the latter.

Figure 15:
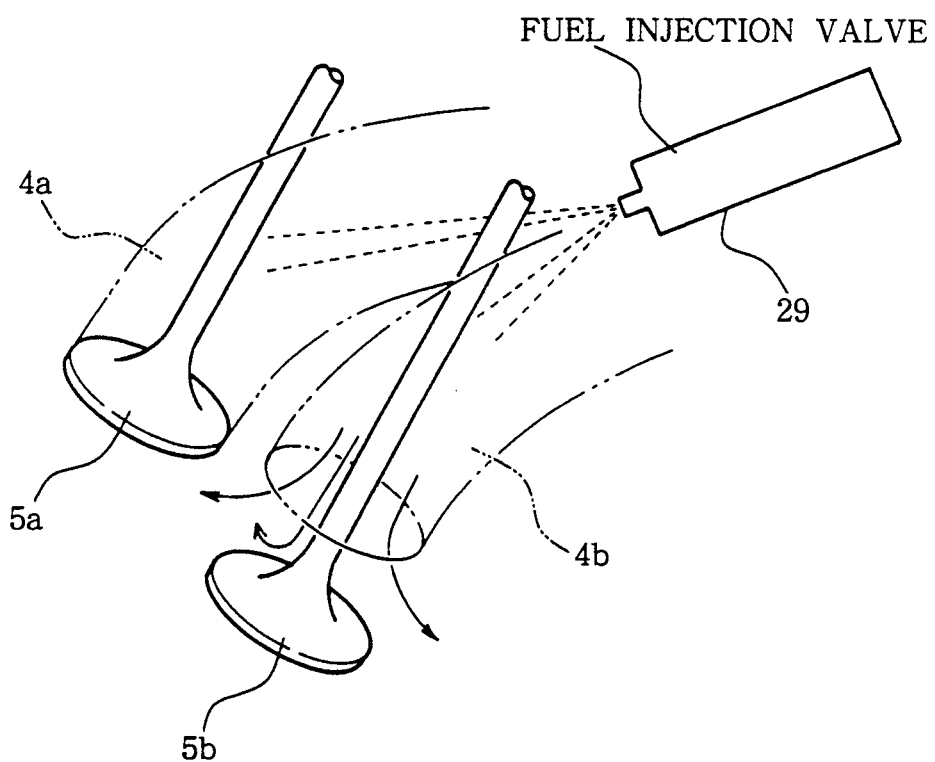
FIG. 15 is a schematic perspective view showing the positional relationship between a fuel injection valve and intake valves.

Further, in an engine having one fuel injection valve and a pair of intake valves provided for each cylinder as shown in FIG. 15, a large amount of injected fuel remains stagnant in an intake passage 4a corresponding to an intake valve 5a inhibited from operating, and the stagnant fuel is drawn into the cylinder at one time when the intake valve 5a starts to be operated, which causes a drastic change in the air-fuel ratio.

Figure 16:
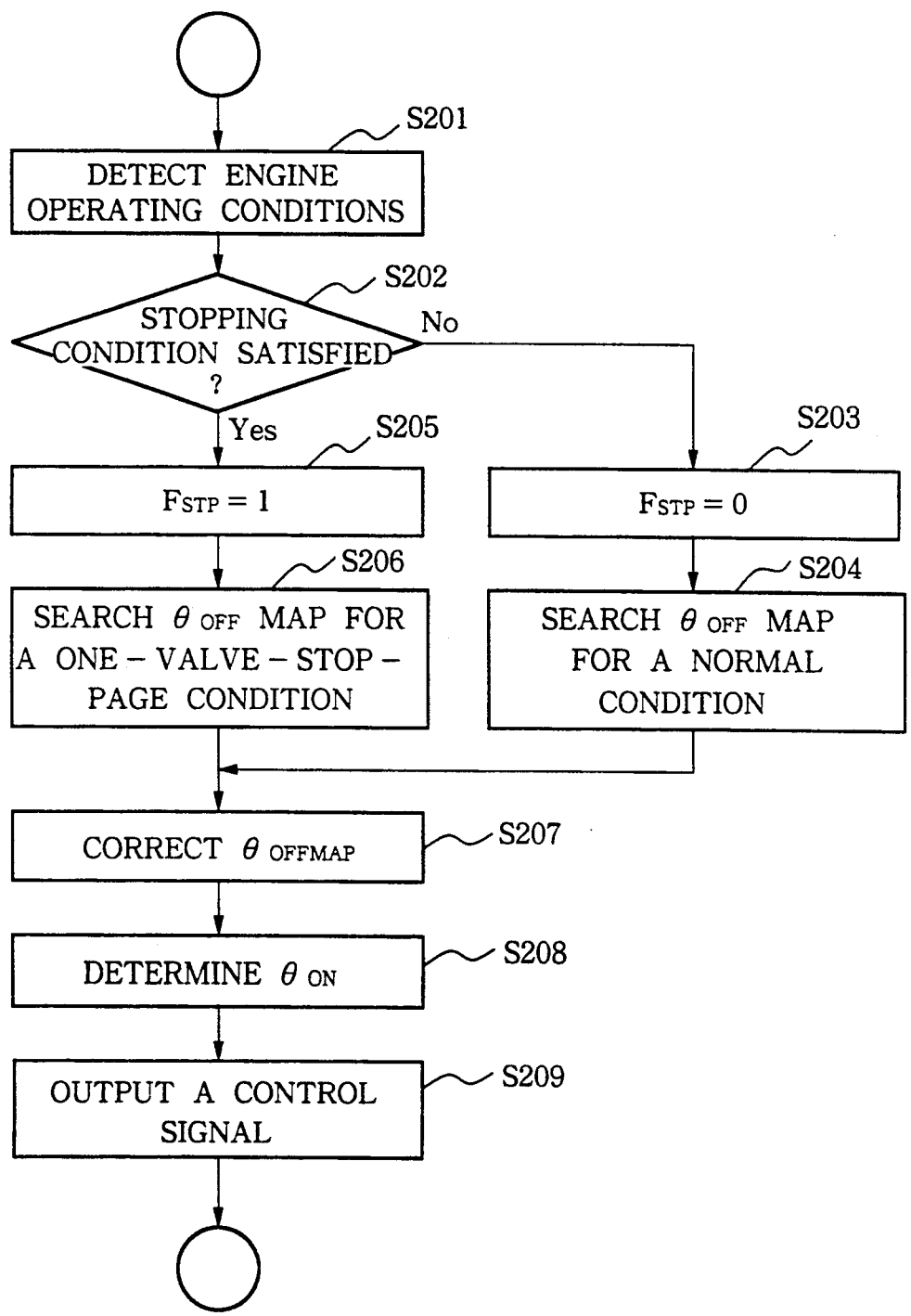
FIG. 16 is a flowchart showing the manner of controlling the operation of the intake valves.

FIG. 16 shows a program for controlling the timing of opening the spill valve 59 (timing of deenergizing the solenoid 71), i.e. the OFF timing $\theta_{OFF}$, and the timing of closing the spill valve 59 (timing of energizing the solenoid 71) i.e. the ON timing $\theta_{ON}$, in order to solve the last-mentioned problems.

At a step S201, output signals from the various sensors are read to detect operating conditions of the engine and atmospheric conditions, and it is determined at a step S202 whether or not an operating condition of the engine is satisfied for stopping the operation of one intake valve 5 of each pair of intake valves 5 and one exhaust valve 15 of each pair of exhaust valves 15 (e.g. the engine coolant temperature $T_W$ is equal to or higher than a predetermined value, and at the same time the engine rotational speed Ne is equal to or lower than a predetermined value, while the accelerator pedal angle $\theta_{ACC}$ is equal to or lower than a predetermined value) (hereinafter refereed to as "the stopping condition"). If the answer to this question is negative (No), i.e. if the stopping condition is not satisfied, a flag $F_{STP}$ is set to a value of 0 at a step S203, and the $\theta_{OFF}$ map for a normal condition is searched at a step S204 as described hereinbefore with reference to the step S8 of FIG. 5, followed by the program proceeding to a step S207.

If the answer to the question of the step S202 is affirmative (Yes), i.e. if the stopping condition is satisfied, the flag $F_{STP}$ is set to a value of 1 at a step S205, and a $\theta_{OFF}$ map for a one-valve-stoppage condition is searched in accordance with the detected engine rotational speed Ne and accelerator pedal angle $\theta_{ACC}$ at a step S206, followed by the program proceeding to the step 207. The $\theta_{OFF}$ map for a one-valve-stoppage condition have set map values thereof corresponding to predetermined ranges of the engine rotational speed and the accelerator pedal angle falling within a low-to-medium load/low-to-medium engine speed region. The map is set such that the map value are suitable for the stopping condition in which one intake valve of each pair of intake valves is stopped.

At a step S207, the map value $\theta_{OFFMAP}$ obtained at the step S204 or the step S206 is corrected based on atmosphere conditions etc. by the aforementioned equation (1).

At a step 208, the timing of closing the spill valve 59, i.e. the ON timing $\theta_{ON}$ of the solenoid 71 is determined by the aforementioned equation (2).

At a step 209, control signals are supplied to the solenoid 71 based on the thus calculated OFF timing $\theta_{OFF}$, ON timing $\theta_{ON}$, and the value of the flag $F_{STP}$.

Figure 17:
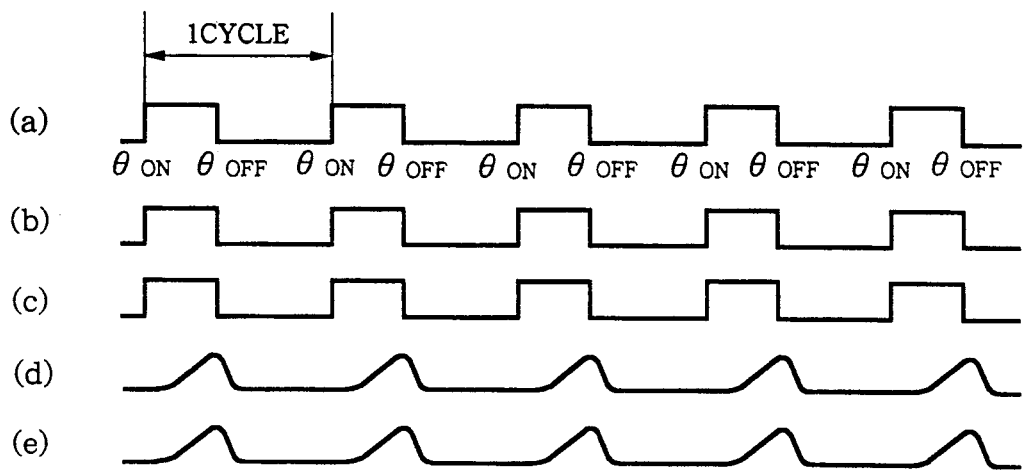
FIGS. 17(a)–(e) are timing chart showing the relationship between control signals for the spill valves and the characteristics of operations of the intake valves when identical control signals are supplied to the spill valves.

When the flag $F_{STP}=0$, i.e. when the stopping condition is not satisfied, the same control signals (as shown in FIG. 17 (b) and (c)) as the control signal (as shown in FIG. 17 (A)) which turns on and off at the calculated timing $\theta_{ON}$ and $\theta_{OFF}$ are supplied to spill valves 59a and 59b, neither of which is shown, respectively corresponding to the pair of intake valves 5a and 5b, such that ON and OFF pulses are simultaneously supplied to the spill valves 59a, 59b. The characteristics of operations of the intake valves 5a and 5b are as shown in FIG. 17 (d) and (e) (the ordinate in the figure indicates the valve lift amount).

Figure 18:
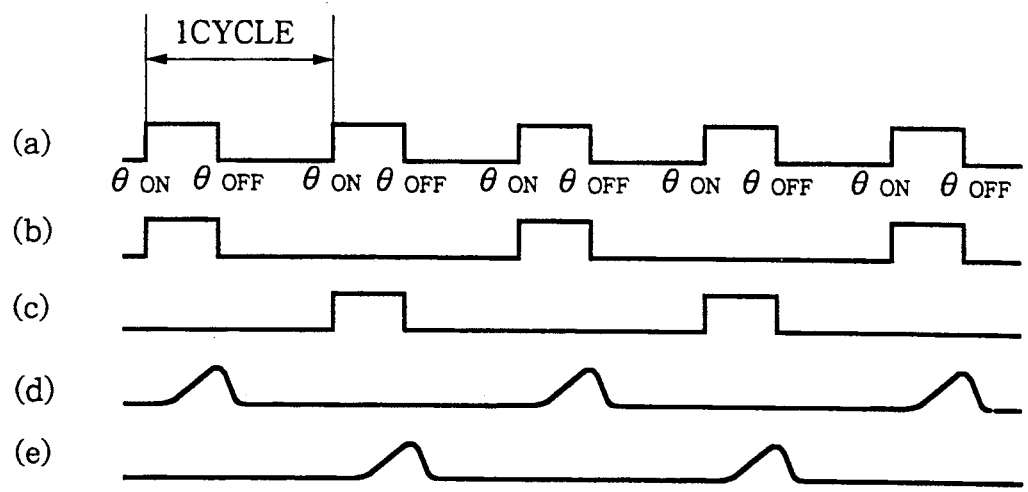
FIGS. 18(a)–(e) are timing charts similar to FIG. 17, showing the relationship when different control signals are alternately supplied to the spill valves.

On the other hand, when the flag $F_{STP}=1$, i.e. when the stopping condition is satisfied, control signals as shown in FIG. 18 are outputted. Specifically, FIG. 18 (a) to (e) respectively correspond to FIG. 17 (a) to (e), and ON and OFF pulses are alternately supplied to the two spill valves 59a, 59b. As a result, the characteristics of operations of the two intake valves 5a and 5b are as shown in FIG. 18 (d) and (e), i.e. a different one of the two valves is inhibited from operating every cycle. Incidentally, the term "cycle" means a sequence of 4 strokes: suction stroke—compression stroke—explosion stroke—exhaust stroke.

As described above, by subjecting a different one of the two intake valves to stoppage every cycle, it is possible to prevent a particular one of the intake valves from being worn earlier than the other, i.e. prevent unevenness in the degree of wear between the two intake valve, and at the same time preserve an excellent mixtured state of the air-fuel mixture. Further, only an amount of fuel which has been injected by one fuel injection can remain stagnant in the intake passage associated with a valve which is stopped, resulting in almost no change in the air-fuel ratio.

In addition, the exhaust valves may be controlled in the same manner as described above with respect to the intake valves.

Although the above described control was applied to an engine equipped with a pair of intake valves and a pair of exhaust valves for each cylinder, this is not limitative, but the present control may be also applied to an engine having three or more intake valves and three or more exhaust valves for each cylinder, such that the three or more intake or exhaust valves are sequentially stopped. For example, when only one of the three intake valves (respectively referred to as "A", "B", and "C") is to be inhibited from operation, the intake valves should be stopped in the order of A-B-C-A, one valve being stopped per one cycle. When two of the three valves are to be inhibited from operation, the valves should be stopped in the order of A and B-B and C-C and A-A and B, two valves being stopped per one cycle.

Further, although according to the above described control, a valve which should be inhibited from operation is changed every cycle. Alternatively the valve may be changed every two ore more cycles.

What is claimed is:

1. A method of controlling an internal combustion engine having at least one intake valve, and timing-setting means capable of setting at least timing of closing said at least one intake valve as desired, comprising the steps of:
    (1) detecting a demand of the driver to said engine;
    (2) detecting operating parameters of said engine including engine rotational speed and temperature;
    (3) controlling the amount of intake air supplied to said engine mainly by changing the period of opening said at least one intake valve by setting said timing of closing said at least one intake valve to such timing that the amount of intake air which makes output of said engine the maximum at the detected engine rotational speed is obtained, when it is detected that the driver demands that the maximum output of said engine should be obtained while said engine is in at least a predetermined operating region of said engine;
    (4) determining whether or not the detected temperature of said engine is in a range higher than a first predetermined value and lower than a second predetermined value which is higher than said first predetermined value; and (5) when said temperature of said engine is determined to be in said range, advancing or retarding said timing of closing said at least one intake valve by a predetermined amount from timing applied when said temperature of said engine is lower than said first predetermined value such that said engine has intake efficiency thereof lowered, while said engine is in a second predetermined operating region of said engine determined based on at least the detected demand of the driver to said engine and the detected engine rotational speed.

2. A method according to claim 1, wherein said predetermined operating region of said engine is a medium-to-high engine speed region.

3. A method according to claim 1, including the step of canceling said advancing or retarding of said timing of closing said at least one intake valve when the detected temperature of said engine becomes lower than said first predetermined value.

4. A method according to claim 1, wherein said second predetermined operating region of said engine is a region in which the driver demands that almost the maximum output of said engine should be obtained and at the same time the detected engine rotational speed is higher than a predetermined value.

5. A method of controlling an internal combustion engine having at least one intake valve, and means capable of setting at least timing of closing said at least one intake valve as desired, comprising the steps of:
  (1) detecting a demand of the driver to said engine;
  (2) detecting operating parameters of said engine including engine rotational speed;
  (3) detecting knocking of said engine;
  (4) when said knocking of said engine is detected, advancing or retarding said timing of closing said at least one intake valve by a predetermined amount from timing applied before occurrence of said knocking such that said engine has intake efficiency thereof lowered, while said engine is at least in a predetermined operating region of said engine determined based on at least the detected demand of the driver to said engine and the detected engine rotational speed; and
  (5) continuing the advancing or retarding of said timing even after said knocking of said engine ceases to occur.

6. A method according to claim 5, including the step of canceling the advancing or retarding of said timing when the operation of said engine is stopped.

7. A method according to claim 5, wherein said predetermined operating region of said engine is a region in which the driver demands that a medium to maximum output of said engine should be obtained, and at the same time the detected engine rotational speed is lower than a predetermined value.

8. A method according to claim 5 or 6, including the steps of changing at least one of an amount of fuel supplied to said engine and ignition timing in accordance with said advancing or retarding of said timing, and canceling said changing in accordance with cancellation of said advancing or retarding of said timing.

9. A method of controlling an internal combustion engine having at least one intake valve, and means capable of setting at least timing of closing said at least one intake valve as desired, comprising the steps of:
  (1) detecting a demand of the driver to said engine;
  (2) detecting operating parameters of said engine including engine rotational speed and temperature;
  (3) setting said timing of closing said at least one intake valve to timing which makes output of said engine the maximum at the detected engine rotational speed, when it is detected that the driver demands that the maximum output of said engine should be obtained while said engine is in at least a predetermined operating region of said engine;
  (4) determining whether or not the detected temperature of said engine s in a range higher than a first predetermined value and lower than a second predetermined value which is higher than said first predetermined value; and
  (5) when said temperature of said engine is determined to be in said range, advancing or retarding said timing of closing said at least one intake valve by a predetermined amount from timing applied when said temperature of said engine is lower than said first predetermined value such that said engine has intake efficiency thereof lowered, while said engine is in a second predetermined operating region of said engine determined based on at least the detected demand of the driver to said engine and the detected engine rotational speed.

10. A method according to claim 9, including the step of canceling said advancing or retarding of said timing of closing said at least one intake valve when the detected temperature of said engine becomes lower than said first predetermined value.

11. A method according to claim 10, wherein said second predetermined operating region of said engine is a region in which the driver demands that almost the maximum output of said engine should be obtained and at the same time the detected engine rotational speed is higher than a predetermined value.

* * * * *